United States Patent [19]

Bailey et al.

[11] Patent Number: 4,825,706
[45] Date of Patent: May 2, 1989

[54] FLOWMETER FOR A MOVING PACKED BED

[75] Inventors: Ralph T. Bailey, Uniontown; Thomas M. Modrak, Alliance; Edgar A. Womack, Jr., Akron, all of Ohio

[73] Assignee: The Babcock & Wilcox Company, New Orleans, La.

[21] Appl. No.: 123,849

[22] Filed: Nov. 23, 1987

[51] Int. Cl.$^4$ .................................................. G01F 5/00
[52] U.S. Cl. .................................... 73/861.05; 73/202
[58] Field of Search ................ 73/202, 861.65, 861.66, 73/861.07, 863.61, 861.05, 861.09

[56] References Cited

U.S. PATENT DOCUMENTS

| | | | |
|---|---|---|---|
| 2,943,045 | 5/1960 | Hull | 73/861.05 |
| 3,308,660 | 3/1967 | De Ford | 73/861.05 |
| 3,739,636 | 6/1973 | Versaci et al. | 73/861.05 |
| 4,170,311 | 10/1979 | Span | 414/289 |

Primary Examiner—Stewart J. Levy
Assistant Examiner—Robert P. Bell
Attorney, Agent, or Firm—Vytas R. Matas; Robert J. Edwards; Daniel S. Kalka

[57] ABSTRACT

An apparatus and method for measuring the flow of a packed bed of particles moving in a primary stream comprises positioning a feedpipe having an open end facing downstream in the primary stream and feeding a secondary stream of particles through the feedpipe to satisfy a void that would otherwise be formed downstream of the feedpipe due to the passage of the primary stream of particles. The flow of the primary stream is proportional to the flow of the secondary stream. The flow of the secondary stream can be measured either by measuring the amount of particles being metered into the feedpipe or by connecting a hopper to the feedpipe and measuring the rate at which a level of particles in the hopper falls.

12 Claims, 3 Drawing Sheets

FLOWMETER FOR A MOVING PACKED BED

FIELD AND BACKGROUND OF THE INVENTION

The present invention relates in general to flow measuring devices and methods, and in particular, to a new and useful technique for measuring the flow rate of a moving packed bed of solid particles.

One possible approach for measuring the low-velocity flow of a packed bed of particles is to weigh the material from the bed flowing from a tap for a particular period of time. Another approach is to insert some sort of mechanical flow meter into the bed itself. If the bed is at high temperature, however, neither of these approaches is practical. Measuring the rate of flow, at low velocity, for example, of a bed of sand or crushed limestone flowing downward, in a standpipe, in which the bed temperature is high (e.g., 1,600° F.), poses particular problems. The bed is not fluidized and thus, is essentially incompressible.

U.S. Pat. No. 3,739,636, to Versaci et al discloses a flow meter for determining the flow rate of a fluid through a conduit wherein a signal having a magnitude that is inversely proportional to the time elapsed for a substance carried by the fluid to travel a fixed distance is produced and converted into a flow rate indication.

U.S. Pat. No. 4,170,311, to Spaw discloses a level measuring system which measures a variable level within a sensing area containing a mass of material. A sensing probe is positioned within the area and is coupled to a tank of an oscillating circuit through a switching network. A reference probe positioned in or near the sensing area is also coupled through the switching network to the tank of the oscillating circuit. The frequency of oscillation depends upon a physical parameter of the mass material within the immediate vicinity of the sensing probe. A signal processing mechanism is coupled to the oscillator for processing this frequency change. The sensing probe can be a cable antenna extending vertically into a material container for measuring the level of material therein.

Neither reference solves the problems posed above with regard to measuring low velocity flow of a packed bed of particles.

SUMMARY OF THE INVENTION

The present invention comprises an apparatus for, and method of measuring the rate of low-velocity flow of a bed of particles, in particular of sand or crushed limestone in a standpipe. According to the present invention, a tube is inserted into the standpipe and extends substantially parallel to the flow. An open end of the tube points downstream in the flow. As particles of sand or other bed material flow over the tube, a void is created at the open end. Sand or other bed material is fed through the tube to fill the void as it is created. The standpipe mass flow can be calculated by metering the flow of the solids into the tube.

The present invention takes advantage of the fact that packed beds of particles behave more like deformable solids than like liquids. In the absence of a net airflow through the bed, or extreme static pressure in the bed, a packed bed will not readily flow around a right angle. Sand or material fed through the tube fills the void as it is created. Ignoring the difference in the cross-sectional area between the inside and outside of the tube, the velocity of the solids in the packed bed on the inside and on the outside of the tube, will be the same. By metering the flow of the solids into the tube, the velocity of solids in the standpipe can be determined. If the approximate bulk density of the bed material is known, the standpipe mass flow can be calculated.

The present invention thus provides a technique for measuring flow in high temperature, packed beds which are typical of those in a standpipe of a circulating fluid bed boiler, in an accurate and continuous manner. Experimental results have shown that solid velocities measured with the apparatus and method of the present invention, agree with those measured by independent methods quite well (±10%) within the range extending from 0.06 inches/second to 6 inches/second and higher.

Accordingly, an object of the present invention is to provide an apparatus for measuring the flow of a packed bed of particles moving in a primary stream, comprising a feed pipe having an open end facing downstream in the primary stream, the bed tending to form a void downstream of the open end of the feed pipe, means for supplying a secondary stream of particles to the feed pipe for filling the void, and means for measuring the flow of the secondary stream of particles, the flow of the secondary stream of particles being proportional to the flow of the packed bed in the primary stream.

Another object of the present invention is to provide a method of measuring the flow of a packed bed of particles moving in a primary stream, comprising positioning a feed pipe with an open end facing downstream in the primary stream, the bed tending to form a void downstream of the open end of the feed pipe, supplying a secondary stream of particles to the feed pipe for filling the void, and measuring the flow of the secondary stream of particles which is proportional to the flow of the packed bed in the primary stream.

A still further object of the present invention is to provide an apparatus for measuring the flow of a packed bed of particles which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
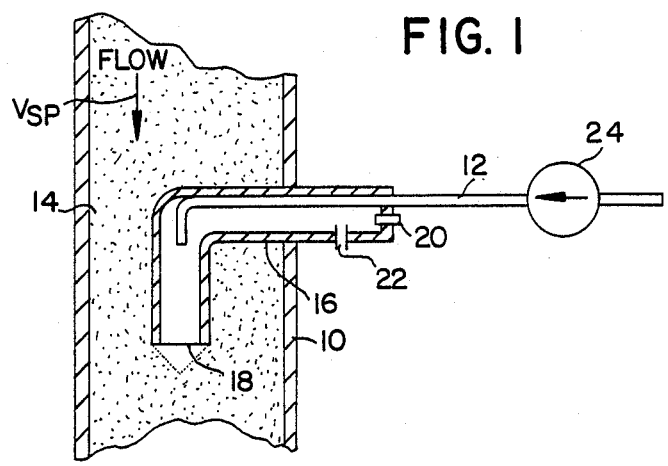
FIG. 1 is a schematic representation of an apparatus in accordance with the present invention.
Figure 2:
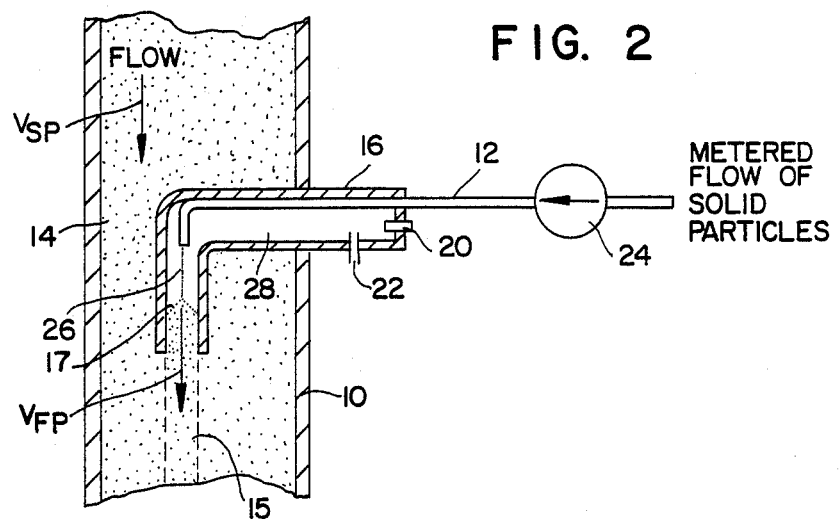
FIG. 2 is a view similar to FIG. 1 showing the apparatus in operation.

Referring to the drawings in particular, the invention embodied in FIGS. 1 and 2 comprises an apparatus for measuring the flow of a packed bed of particles 14 in a primary stream flowing in a standpipe 10 at a velocity $V_{sp}$ which is shown by the arrow in FIG. 1. A feedpipe 16 has an open end 18 which faces downstream in the primary stream 14. Since the packed bed of particles 14, acts more like a deformable solid than like a liquid, a void will be formed immediately downstream of the open end 18 as shown by the triangular space in FIG. 1 immediately below the open end 18. If, in accordance with the present invention, a metered flow of solid particles is supplied over a feed tube 12 by metering means 24, the secondary stream of particles 26 is supplied at a rate sufficient to completely fill the void. A stream of particles 15 moving at velocity $V_{fp}$ is then discharged into the primary stream of the packed bed 14. If the packed bed 14 and stream of particles 15 are moving only under the influence of gravity or slight pressure, the velocity $V_{sp}$ will be substantially equal to the velocity $V_{fp}$.

This fact can be used advantageously to accurately measure the flow $V_{sp}$ by knowing the flow of $V_{fp}$. To do this in the embodiment of FIGS. 1 and 2, a sensor 20, such as an acoustic detector, can be provided in the feedpipe 16 to sense the volume of gas in space 28. This is the same as measuring the level of particles at 17 in feedpipe 16. By controlling metering means 24 to provide just enough of a secondary stream of particles to maintain a constant level 17 (as confirmed by the sensor 20), the flow of the secondary stream will be proportional to the flow of the primary stream.

A vent 22 may be provided in feedpipe 16 to permit changes in the level 17 of particles in the feedpipe.

Figure 3:
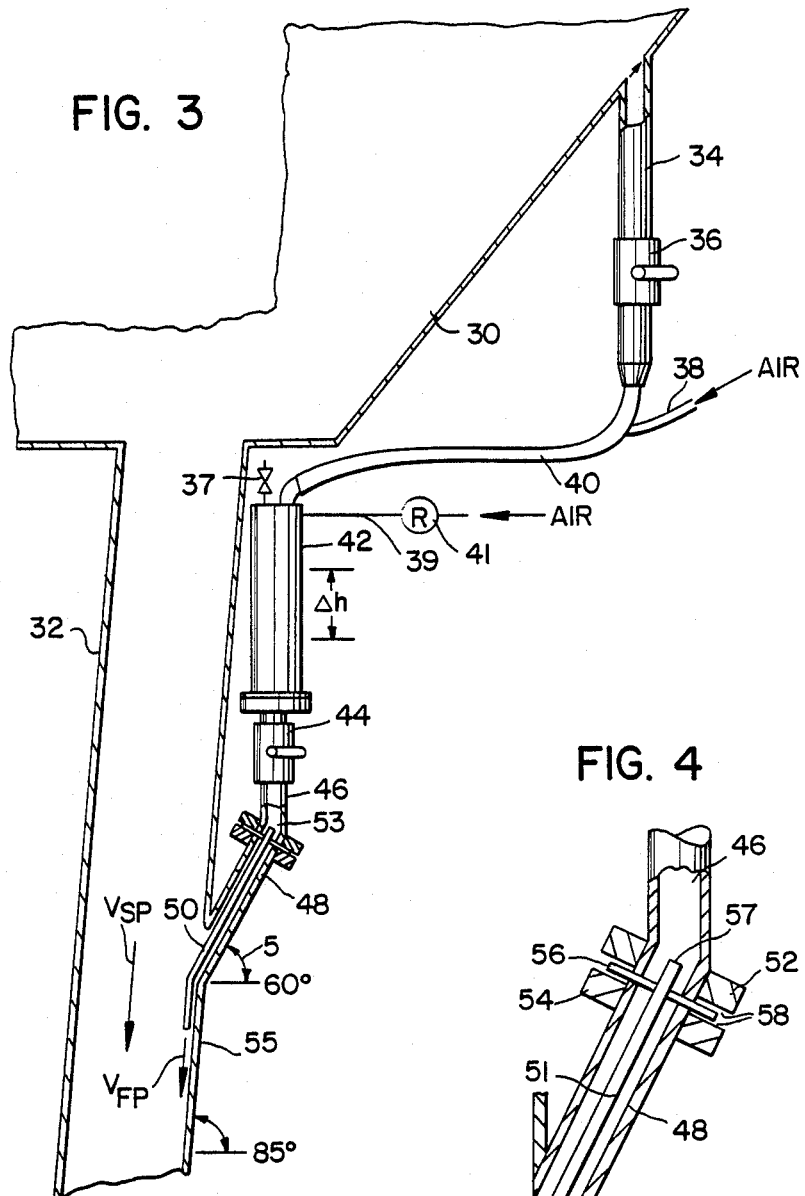
FIG. 3 is a side elevational view of an apparatus in accordance with the present invention for measuring the flow rate of a packed bed of particles in a standpipe.

FIG. 3 shows an embodiment of the invention where a hopper 30 carries a quantity of particles such as sand, limestone, pulverized coal or the like. A standpipe 32 extends downwardly from the bottom of hopper 30 and carries a packed bed of the particles moving in a primary stream at velocity $V_{sp}$. In accordance with the invention, a sample pipe 34 is connected to hopper 30 for receiving a supply of particles which are provided over a valve 36 and flexible hose 40 to the top of a clear feed hopper 42. The sample stream of particles are then supplied over a valve 44 to a transfer pipe 46 which has a lower end comunicating with the upper open end 53 of a feedpipe 50. In FIG. 3, feedpipe 50 has an inclined portion which is inclined at an angle 5 of about 60° to the horizontal and a spout portion which extends into the standpipe 32 and parallel to the primary flow of particles in the standpipe.

Figure 4:
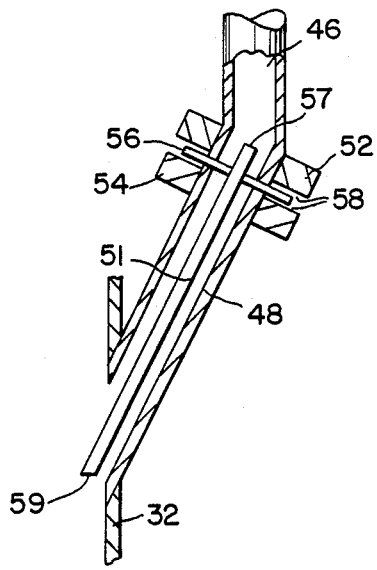
FIG. 4 is a partial sectional view of FIG. 3 on an enlarged scale showing an alternate embodiment for the feed pipe.

FIG. 4 shows an alternate embodiment for the feedpipe shown at 51 which is simply a straight incline section of pipe having an open upper end 57 and an open lower end 59.

Feedpipes 50 and 51 are both held by a metal disk 56 (FIG. 4) that is held between flanges 52, 54 and gaskets 58. Upper flange 52 is fixed to the lower end of transfer pipe 46 and lower flange 54 is fixed to the upper end of a transfer pipe 48 that is connected through the wall of standpipe 32.

The standpipe in the embodiment of FIG. 3 is shown to be substantially vertical with respect to the horizontal, but is not a requirement of the measurement technique. It is advantageous to provide the feedpipe 50 or 51 with an incline section that is inclined more than 30° with respect to the horizontal to provide adequate flow of the secondary stream of particles through the feedpipe.

It is advantageous to supply the feed hopper 42 with air at a pressure that is equal to or greater than the gas pressure in the standpipe 32. The pressurized air in feed hopper 42 prevents the invasion of gas and particles from the primary stream into the open lower end 55, 59 of the feedpipe 50, 51 and facilitates the movement of particulates into and through the valve 44, transfer pipe 46 and feedpipe 50, 51. To this end, air assist line 39 and pressure regulator 41 are connected to the feed hopper 42 and provides pressurized air. A differential pressure meter can be connected between feed hopper 42 and standpipe 32 for this purpose.

In this embodiment of FIG. 3, hose 40 extends somewhat horizontally. Air assist line 38 is used to facilitate the movement of sample particles along hose 40 while filling the feed hopper 42 with sample particles from the hopper 30.

A vent valve 37 is also provided in feed hopper 42 to vent the feed hopper to the atmosphere.

In operation, valve 44 is first closed to prevent flow from the feed hopper 42 to the primary stream. Valve 37 is then opened to vent air from the feed hopper 42. Valve 36 in the sample pipe 34 is then opened and air is supplied to line 38 to fill the feed hopper 42 with particles from the U-beam hopper 30. Once the hopper is filled, the supply of air is stopped and valves 36 and 37 are closed.

The air pressure in the feed hopper 42 is set equal to or greater than the gas pressure in the primary stream using air line 39 and regulator 41. Valve 44 is then opened to allow a secondary flow of particles into the upper open end 53 of feedpipe 50 and out through the lower open end 55. The secondary stream moves at velocity $V_{fp}$, which is substantially equal to the mainstream velocity $V_{sp}$. After an initial sudden drop of the particle level in feed hopper 42, which is due to the filling of transfer 46 and feedpipe 50, the level of particles in feed hopper 42 will drop at a rate which is directly proportional to the velocity $V_{fp}$. By measuring the time it takes the level to drop a known distance delta h, the velocity $V_{fp}$ can be calculated as follows:

$$V = \frac{\Delta h}{\Delta t} \times \frac{\text{(Feed Hopper Area)}}{\text{(Feedpipe area)}}$$

where delta t is the measured time for the heigth of the particle level to change the distance delta h. The feed hopper area is the cross-sectional area of the feed hopper and the feedpipe area is the effective cross-sectional area of the feedpipe.

Figure 5:
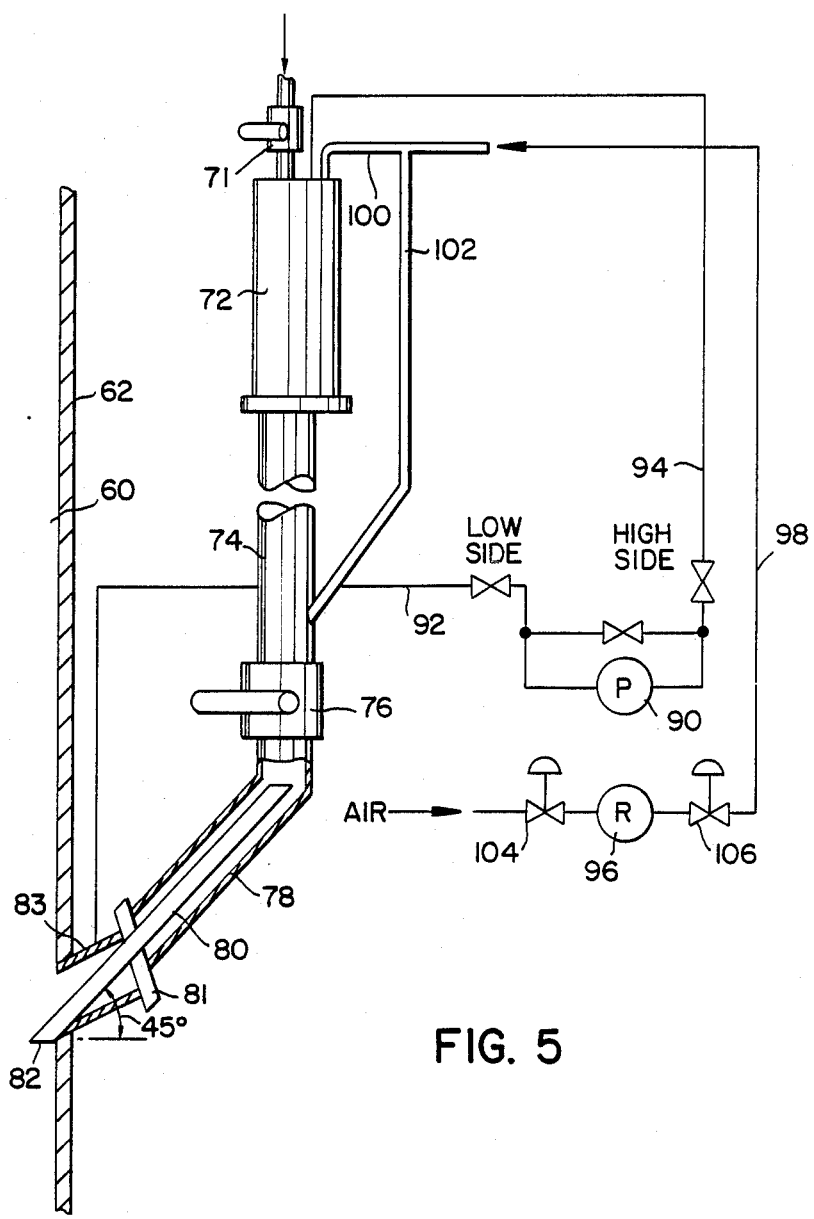
FIG. 5 is a side elevational view of a still further embodiment of the present invention.

FIG. 5 shows an embodiment of the invention which is particularly suited for hot (e.g. 1,600° F.) low velocity, packed beds 60 which are confined in a primary stream within a pipe or conduit 62. A feedpipe 80 having a lower open end 82 which is facing downstream is truncated in a manner similar to that shown in FIG. 4. This minimizes the amount of feedpipe extending into the primary stream. This is advantageous to reduce erosion where the stream of particles may be abrasive.

In the embodiment of FIG. 5, feedpipe 80 is inclined at 45° to the horizontal.

A feed hopper 72 provided with sample particles over a valve 71, is connected to a transfer pipe 74 which supplies particles over valve 76 to a second transfer pipe 78 which contains the upper end of feedpipe 80. Feedpipe 80 is held within a plate 81 so that a secondary stream of particles is supplied over feedpipe 80 into the primary stream 60.

A differential pressure meter 90 is provided for measuring the pressure difference between its low side which is connected over airline 92 to a fitting 83 which communicates directly with the interior of conduit 62, and a high side connected to a line 94, which communicates with the interior of feed hopper 72. A regulator 96 is connected to a supply of pressurized air and supplied at a variable pressure over a pressure line 98 to pipes 100 and 102. Pipe 100 is connected to the top of hopper 72 and pipe 102 is connected just above valve 76. Regulator 96 is adjusted to produce a desired pressure differential as measured by meter 90 to compensate for pressures inside conduit 62 and to also help convey the particles into and along transfer pipe 74, valve 76 and feedpipe 80.

The velocity of the packed bed 60 in conduit 62 can be measured in a manner similar to that used in the embodiment of FIG. 3.

While a specific embodiment of the invention has been shown and described in detail to illustrate the application of the principles of the invention, it will be understood that the invention may be embodied otherwise without departing from such principles.

The invention claimed is:

1. An apparatus for measuring the flow of a packed bed of particles moving in a primary stream, comprising:
   a feedpipe having an open end facing downstream in the primary stream to form a void in the bed downstream of the open end of the feedpipe;
   means for supplying a secondary stream of particles to the feedpipe for filling the void; and
   means for measuring the flow of the secondary stream of particles before the secondary stream enters the primary stream, the flow of the secondary stream being proportional to the flow of the packed bed in the primary stream.

2. An apparatus according to claim 1 wherein said feedpipe has a portion extending parallel to the primary stream.

3. An apparatus according to claim 1 wherein said feedpipe has a portion extending at an angle of greater than 30° with respect to the horizontal.

4. An apparatus according to claim 1 wherein said means for supplying comprises a feed tube connected to said feedpipe for supplying particles of the secondary stream into the feedpipe and means for metering the flow of particles of the secondary stream into the feedpipe.

5. An apparatus for measuring the flow of a packed bed of particles moving in a primary stream, comprising:
   a feedpipe having an open end facing downstream in the primary stream to form a void in the bed downstream of the open end of the feedpipe;
   a feed tube connected to said feedpipe for supplying particles of a secondary stream into the feedpipe for filling the void;
   means for metering the flow of particles of the secondary stream into the feedpipe;
   a sensor connected to said feedpipe for sensing a level of particles in said feedpipe which are above said open end of said feedpipe; and
   means for measuring the flow of the secondary stream of particles, the flow of the secondary stream being proportional to the flow of the packed bed in the primary stream.

6. An apparatus for measuring the flow of a packed bed of particles moving in a primary stream, comprising:
   a feedpipe having an open end facing downstream in the primary stream to form a void in the bed downstream of the open end of the feedpipe, said feedpipe having an opposite open end which is above said open and facing downstream in said primary stream;
   a feed hopper connected to said opposite open end of said feedpipe for filling the void with a secondary stream of particles, said feed hopper containing a supply of particles for said secondary stream, the level of particles in said feed hopper falling at a rate which is proportional to the velocity of the secondary stream of particles through said feedpipe; and
   means for measuring the flow of the secondary stream of particles, the flow of the secondary stream being proportional to the flow of the packed bed in the primary stream.

7. An apparatus according to claim 6 including an air pressure line connected to said hopper and a pressure regulator in said air pressure line for regulating pressure in said air pressure line supplied to said hopper for regulating the pressure in said hopper to a pressure that is equal to or greater than the gas pressure in the primary stream.

8. An apparatus according to claim 7 wherein said feedpipe includes a section extending at an angle of greater than 30° with respect to the horizontal.

9. A method of measuring the flow of a packed bed of particles moving in a primary stream, comprising the steps of:
   positioning a feedpipe with an open end facing downstream in the primary stream to form a void in the bed downstream of the open end of the feedpipe;
   supplying a secondary stream of particles into the feedpipe for filling the void; and
   measuring the flow of the secondary stream of particles before the secondary stream enters the primary stream, of which the flow of the secondary stream is proportional to the flow of the particles of the primary stream.

10. A method according to claim 9 further comprising the steps of supplying particles into the feedpipe at a rate which maintains the level of particles in the feedpipe at a constant level; and measuring the rate of flow of particles into the feedpipe which corresponds to the flow of the secondary stream.

11. A method of measuring the flow of a packed bed of particles moving in a primary stream, comprising the steps of:
   positioning a feedpipe with an open end facing downstream in the primary stream to form a void in the bed downstream of the open end of the feedpipe;
   connecting a hopper to the feedpipe;
   filling the hopper to a selected level with particles;
   supplying a secondary stream of particles into the feedpipe for filling the void;
   measuring the rate at which the level of particles in the hopper falls; and
   calculating the flow of the secondary stream as a function of the rate at which the level of particles in the hopper falls to determine the flow of the particles of the primary stream.

12. A method according to claim 11 including supplying a regulated stream of pressurized air to the hopper for facilitating movement of particles from the hopper to the feedpipe and for equalizing pressure between the hopper and the primary stream.

* * * * *